United States Patent
Matsushima et al.

(10) Patent No.: US 9,969,432 B2
(45) Date of Patent: May 15, 2018

(54) VEHICLE BODY FRONT STRUCTURE

(71) Applicant: HONDA MOTOR CO., LTD., Tokyo (JP)

(72) Inventors: Yuki Matsushima, Wako (JP); Tomohide Sekiguchi, Wako (JP); Keisuke Kawabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 32 days.

(21) Appl. No.: 15/332,244

(22) Filed: Oct. 24, 2016

(65) Prior Publication Data

US 2017/0113726 A1   Apr. 27, 2017

(30) Foreign Application Priority Data

Oct. 26, 2015   (JP) .................. 2015-209672

(51) Int. Cl.
| | |
|---|---|
| *B60N 99/00* | (2006.01) |
| *B62D 21/15* | (2006.01) |
| *B60R 19/34* | (2006.01) |
| *B62D 25/08* | (2006.01) |
| *B60R 19/24* | (2006.01) |

(52) U.S. Cl.
CPC ............ *B62D 21/152* (2013.01); *B60R 19/34* (2013.01); *B62D 25/082* (2013.01); *B60R 2019/247* (2013.01)

(58) Field of Classification Search
CPC .... B62D 21/152; B62D 25/082; B60R 19/34; B60R 2019/247
See application file for complete search history.

(56) References Cited

U.S. PATENT DOCUMENTS

| | | | |
|---|---|---|---|
| 9,771,106 B2* | 9/2017 | Ogawa | B62D 21/152 |
| 2015/0115653 A1* | 4/2015 | Ookubo | B62D 21/152 296/187.1 |
| 2016/0107695 A1* | 4/2016 | Lee | B62D 21/152 296/187.09 |
| 2016/0280272 A1* | 9/2016 | Haga | B62D 21/152 |

FOREIGN PATENT DOCUMENTS

| | | |
|---|---|---|
| JP | 2007-190964 A | 8/2007 |
| JP | 2010-125884 A | 6/2010 |

\* cited by examiner

*Primary Examiner* — Lori L Lyjak
(74) *Attorney, Agent, or Firm* — Westerman, Hattori, Daniels & Adrian, LLP

(57) ABSTRACT

A vehicle body front structure includes left and right extension side mount members that are provided at rear ends of left and right bumper beam extensions of a front bumper beam and left and right front side frames whose front ends are coupled with the left and right extension side mount members, respectively. The vehicle body front structure further includes left and right gussets that are positioned on left and right corners between outer surfaces in a vehicle width direction of rear end portions of the left and right bumper beam extensions and the left and right extension side mount members, respectively. The left and right gussets are joined to the left and right bumper beam extensions, respectively. Strength of the left and right gussets is higher than strength of the left and right bumper beam extensions.

11 Claims, 13 Drawing Sheets

VEHICLE BODY FRONT STRUCTURE

CROSS REFERENCES TO RELATED APPLICATIONS

The present application claims priority under 35 U.S.C. § 119 to Japanese Patent Application No. 2015-209672, filed Oct. 26, 2015, entitled "Vehicle Body Front Structure." The contents of this application are incorporated herein by reference in their entirety.

TECHNICAL FIELD

The present disclosure relates to techniques of improving a vehicle body front structure.

BACKGROUND

In a vehicle such as a passenger vehicle, a front bumper beam that extends in a vehicle width direction is positioned at a front end of a vehicle body. Left and right bumper beam extensions that extend rearward are provided at both end portions of the front bumper beam in the longitudinal direction. Left and right extension side mount members are provided at rear ends of the left and right bumper beam extensions. Front ends of left and right front side frames are coupled with the left and right extension side mount members.

In recent years, techniques related to absorption of collision energy in a case where a narrow offset collision occurs to a front portion of a vehicle body have been developed. For example, Japanese Unexamined Patent Application Publication No. 2007-190964 and Japanese Unexamined Patent Application Publication No. 2010-125884 describe such techniques.

Japanese Unexamined Patent Application Publication No. 2007-190964 describes a vehicle body front structure that has two bumper beam extensions on each of left and right sides. The left and right bumper beam extensions that are positioned on the inside are coupled with the front ends of the left and right front side frames. The left and right bumper beam extensions that are positioned on the outside are coupled with front ends of front lower end portions of left and right front upper members. The left and right front upper members are positioned on the outside of the left and right front side frames in the vehicle width direction.

Japanese Unexamined Patent Application Publication No. 2010-125884 describes a vehicle body front structure that has left and right bumper beam extensions whose cross sections are horizontally long rectangular shapes in a front view.

SUMMARY

According to the inventors, the front bumper beam curves such that a central portion thereof in the vehicle width direction is protruded forward when the vehicle body is seen from above. Thus, in a case where a narrow offset collision occurs to the front portion of the vehicle body, a load in the vehicle width direction from one end portion side where the collision occurs toward the other end portion side is applied to the front bumper beam. This load in the vehicle width direction is a horizontal component force of the collision load. Thus, a bending moment toward a central side in the vehicle width direction is exerted on the bumper beam extension and the front side frame on the side where the collision occurs.

The bumper beam extension is a member that receives collision load and is compressed and deformed to thereby absorb the collision energy. In a case where the bending moment toward the central side in the vehicle width direction occurs to the bumper beam extension, this bumper beam extension is non-uniformly compressed and deformed. In order for the front side frame to be efficiently folded and deformed or compressed and deformed by receiving the collision load of a narrow offset collision and thereby to sufficiently absorb the collision energy, an influence of the bending moment on the front side frame is preferably removed as much as possible.

It is desirable to provide techniques that enable left and right front side frames to efficiently absorb collision energy of a narrow offset collision.

According to one aspect of the present disclosure, a vehicle body front structure includes: a front bumper beam that is positioned at a front end of a vehicle body and extends in a vehicle width direction; left and right bumper beam extensions that extend rearward from both end portions of the front bumper beam in a longitudinal direction; left and right extension side mount members that are provided at rear ends of the left and right bumper beam extensions; and left and right front side frames whose front ends are coupled with the left and right extension side mount members.

The vehicle body front structure has left and right gussets which are positioned on left and right corners between outer surfaces in the vehicle width direction in rear end portions of the left and right bumper beam extensions and the left and right extension side mount members. The left and right gussets are configured to be joined to the left and right bumper beam extensions. Strength of the left and right gussets is higher than strength of the left and right bumper beam extensions.

In a case where a narrow offset collision occurs to a front portion of the vehicle body, a load (a horizontal component force of the collision load) in the vehicle width direction from one end portion side on which the collision occurs toward the other end portion side is applied to the front bumper beam. In an early period of the collision, a bending moment toward a vehicle width central side (inward bending moment) occurs to the bumper beam extension and the front side frame on a collision side. The bumper beam extension undergoes compressive deformation.

However, the left and right gussets are positioned on the left and right corners between the outer surfaces in the vehicle width direction in the rear end portions of the left and right bumper beam extensions and the left and right extension side mount members. That is, the left and right gussets are positioned on the outside in the vehicle width direction of the left and right front side frames. Thus, the compressive deformation of the bumper beam extension progresses, and the collision load thereby starts being applied to the gusset in an intermediate period of the collision.

The strength of the gussets is higher than the strength of the bumper beam extensions. Accordingly, the gussets are less likely to collapse. The collision load is applied to the gusset, and a bending moment toward the outside in the vehicle width direction (outward bending moment) thereby occurs to the bumper beam extension and the front side frame on the collision side. The outward bending moment is exerted so as to cancel the inward bending moment. Further, the left and right gussets are joined to the outer surfaces in the vehicle width direction in the rear end portions of the left and right bumper beam extensions. Thus, the outward bending moment is applied to bend the bumper beam extension and the front side frame outward in the vehicle width direction via the gusset.

As described above, the collision load is applied to the gusset, and bending deformation and the compressive deformation of the bumper beam extension and the front side frame may thereby be facilitated. As a result, the collision energy of a narrow offset collision may efficiently be absorbed by the left and right front side frames.

The vehicle body front structure preferably further includes left and right front upper members that are positioned on outsides of the left and right front side frames in the vehicle width direction and extend forward and downward from left and right front pillars. The left and right gussets are preferably configured to be joined to front lower end portions of the left and right front upper members via the left and right extension side mount members. Front surfaces of the left and right gussets are preferably inclined in a rearward direction of the vehicle body from the left and right bumper beam extensions toward the outsides in the vehicle width direction.

As described above, the left and right gussets are positioned on the left and right corners between the outer surfaces in the vehicle width direction in the rear end portions of the left and right bumper beam extensions and the left and right extension side mount members. Further, the front surfaces of the left and right gussets are inclined in the rearward direction of the vehicle body from the left and right bumper beam extensions toward the outsides in the vehicle width direction. That is, the left and right gussets are substantially formed in general triangular shapes in a plan view. Thus, in a case where the collision load of a narrow offset collision is applied to the gusset, the collision load may efficiently be transmitted from the gusset to the front lower end portion of the front upper member. The front upper members in addition to the front side frames may sufficiently absorb the collision energy.

The left and right gussets are preferably configured to have closed cross sections. Left and right stiffening plates for reinforcement are preferably provided in internal portions of the left and right gussets in vicinities of portions in the left and right gussets, the portions being joined to the outer surfaces in the vehicle width direction in the rear end portions of the left and right bumper beam extensions.

Thus, the rigidity of joining portions of the left and right gussets to the rear end portions of the left and right bumper beam extensions may be enhanced. The gussets are less likely to collapse with respect to the collision load of a narrow offset collision. Accordingly, the bending deformation and the compressive deformation of the bumper beam extensions and the front side frames may further be facilitated. As a result, because the collision energy of a narrow offset collision may efficiently be absorbed by the left and right front side frames, collision energy absorbing performance may further be enhanced.

The left and right extension side mount members are preferably configured to be joined to inner surfaces in the vehicle width direction in the rear end portions of the left and right bumper beam extensions.

Thus, in a case where a narrow offset collision occurs to the front bumper beam, particularly in a case where a collision occurs to a position on the outside in the vehicle width direction of the left and right bumper beam extensions, the mount member may support the bumper beam extension such that the bumper beam extension does not laterally buckle toward a vehicle width central portion. That is, lateral buckling of the bumper beam extension with respect to the front side frame may be restrained. As a result, the collision load may efficiently be transmitted from the bumper beam extension to the front side frame.

The left and right extension side mount members preferably allow the rear end portions of the left and right bumper beam extensions and the left and right gussets to be interposed between upper portions and lower portions of the left and right extension side mount members.

Thus, the supporting rigidity of support for the left and right bumper beam extensions and the left and right gussets by the left and right extension side mount members may be enhanced. As a result, vibrations in the up-down direction of the front bumper beam may be reduced. Accordingly, the noise and vibration (NV) performance of a whole vehicle may be enhanced. Further, in a case where a collision occurs to the front portion of the vehicle body and an upward or downward collision load is thereby applied to the front bumper beam, buckling of the left and right bumper beam extensions and the left and right gussets in the up-down direction may be inhibited.

The vehicle body front structure preferably further includes left and right side coupling members that couple the front lower end portions of the left and right front upper members with front end portions of the left and right front side frames. The left and right side coupling members are preferably configured to be joined to rear surfaces of the left and right extension side mount members.

Thus, the left and right side coupling members may reinforce the left and right gussets. That is, the gussets may sufficiently be supported from a rear side by the side coupling members in a case where an outward bending moment occurs. Accordingly, an outward bending moment for canceling an inward bending moment may sufficiently be generated. Further, the collision load may be dispersed from the gussets to the front end portions of the front side frames and the front lower end portions of the front upper members.

The left and right gussets are preferably fastened to the left and right bumper beam extensions by using bolts.

As described above, both of those may tightly be fastened together by bolts. Accordingly, in a case where an inward bending moment occurs to the bumper beam extension or a case where an outward bending moment occurs to the gusset, detachment of the gusset from the bumper beam extension may sufficiently be inhibited. Thus, in a case where an outward bending moment occurs to the gusset, an outward bending moment is likely to occur to the bumper beam extension also.

The left and right front side frames preferably each have at least three yielding portions, which are left and right front side yielding portions, left and right intermediate yielding portions that are separately positioned in a rear of the left and right front side yielding portions, and left and right rear side yielding portions that are separately positioned in the rear of the left and right intermediate yielding portions. The left and right front side yielding portions are preferably portions that absorb collision energy by being folded while protruding inward in the vehicle width direction when receiving a collision load which is applied from a front to the front end of the vehicle body. The left and right rear side yielding portions are preferably energy absorbing portions that are capable of absorbing the collision energy by being folded outward in the vehicle width direction due to the collision load. The left and right intermediate yielding portions are preferably fold assisting portions that are capable of being folded outward in the vehicle width direction to allow the left and right front side yielding portions and the left and right rear side yielding portions to be folded.

Thus, in the front side frame, the three kinds of yielding portions, which are the front side yielding portion, the intermediate yielding portion, and the rear side yielding portion, may be folded and deformed due to the collision load transmitted from the bumper beam extension. Those three kinds of yielding portions are folded and thereby an absorption amount of the collision energy may be increased.

BRIEF DESCRIPTION OF THE DRAWINGS

The advantages of the disclosure will become apparent in the following description taken in conjunction with the following drawings.

DETAILED DESCRIPTION

An embodiment of the present disclosure will hereinafter be described with reference to the attached drawings.

Embodiment

A vehicle body front structure according to the embodiment will be described with reference to the drawings. Note that "front", "rear", "left", "right", "up", and "down" are based on the directions that are seen from a driver, Fr represents the front side, Rr represents the rear side, Le represents the left side, and Ri represents the right side.

Figure 1:
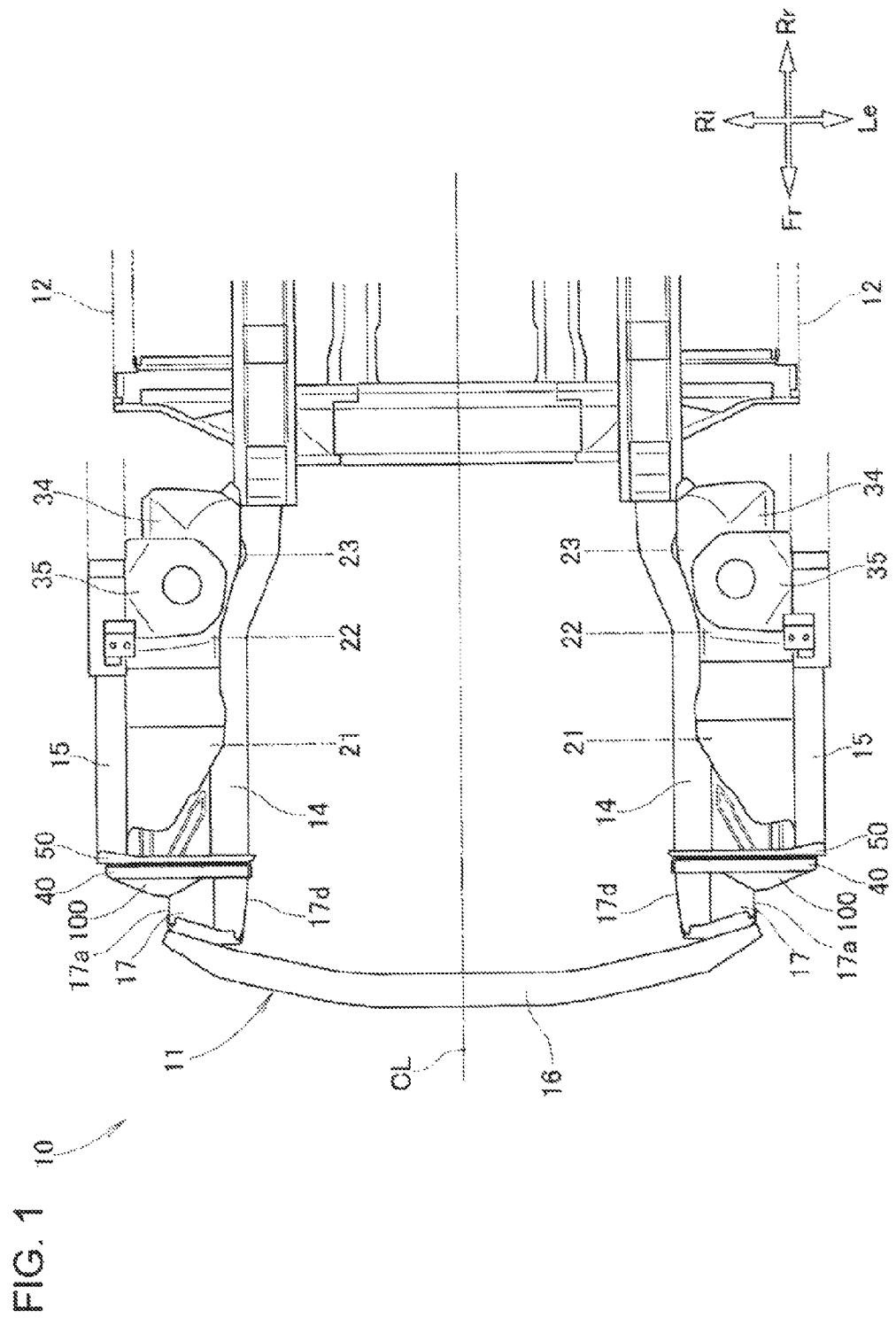
FIG. 1 is a plan view of a front portion of a vehicle body according to one embodiment of the present disclosure.

As illustrated in FIG. 1, a vehicle 10 such as a passenger vehicle has a vehicle body 11 of a monocoque body. The vehicle body 11 is formed in a substantially bilaterally symmetrical shape with respect to a vehicle width center line CL that passes the center of a vehicle width direction of the vehicle 10 and extends in a vehicle body front-rear direction.

Figure 2:
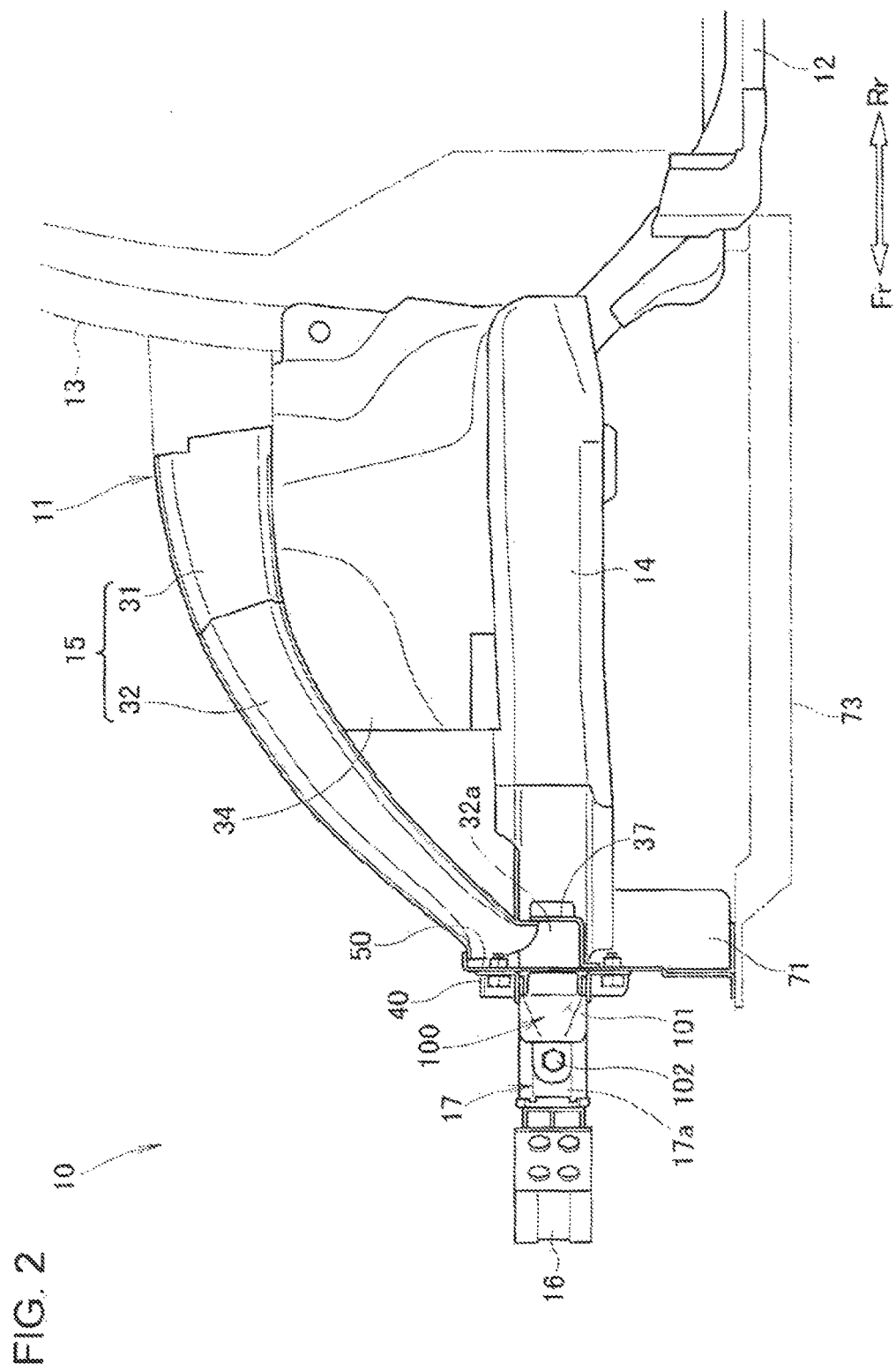
FIG. 2 is a left side view of the front portion of the vehicle body, which is illustrated in FIG. 1.

As illustrated in FIGS. 1 and 2, a front portion of the vehicle body 11 includes left and right side sills 12, 12, left and right front pillars 13 (only the left front pillar illustrated), left and right front side frames 14, 14, left and right front upper members 15, 15, and a front bumper beam 16.

The left and right side sills 12, 12 are positioned on both sides in the vehicle width direction of a central portion in the vehicle body front-rear direction and extend in the vehicle body front-rear direction. The left and right front pillars 13 extend upward from front end portions of the left and right side sills 12, 12.

The left and right front side frames 14, 14 are positioned on both sides in the vehicle width direction of the front portion of the vehicle body and extend in the vehicle body front-rear direction. That is, the left and right front side frames 14, 14 are positioned on the inside in the vehicle width direction and on a front side of the left and right side sills 12, 12 and extend in the vehicle body front-rear direction.

Figure 3:
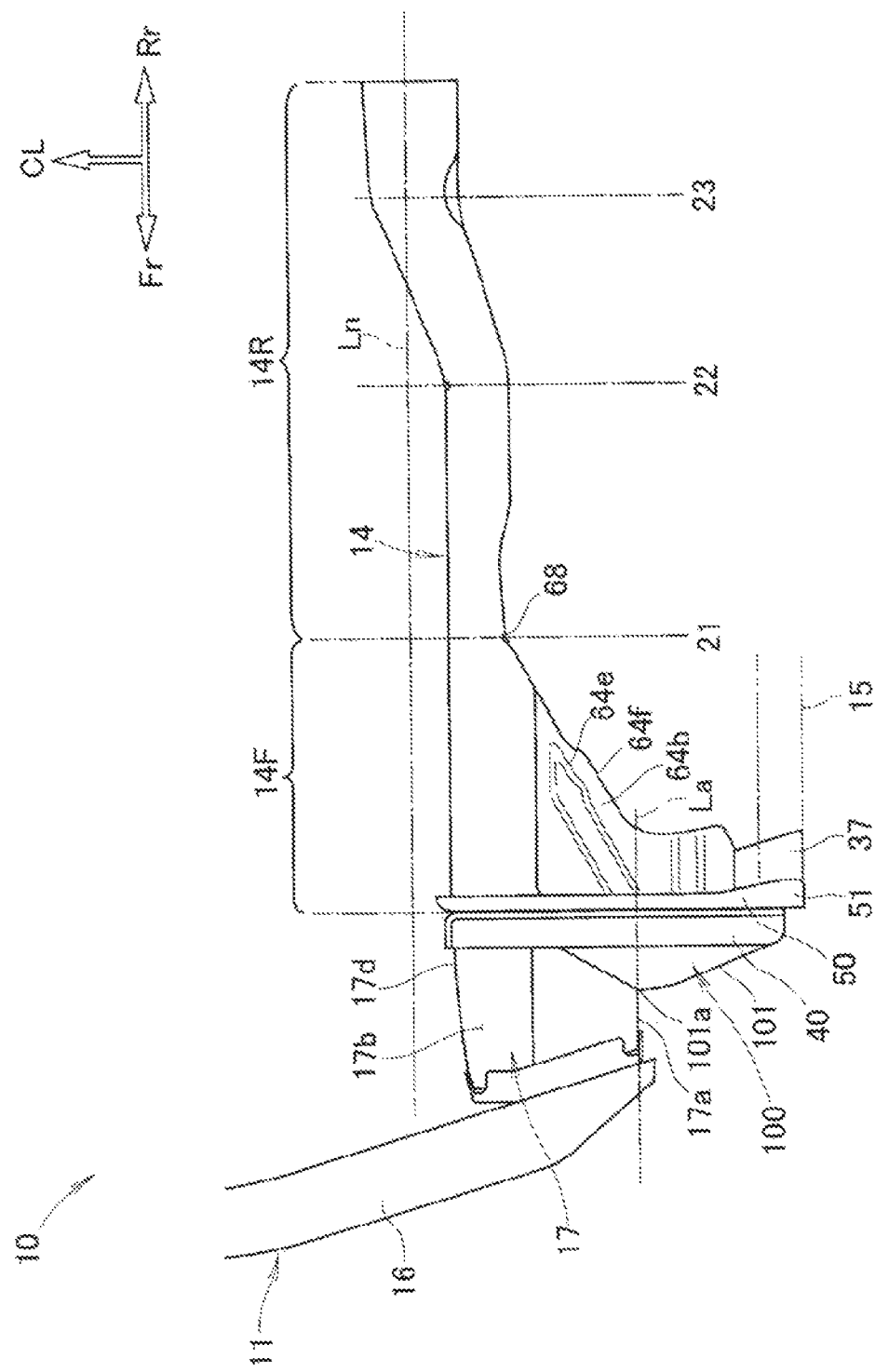
FIG. 3 is a plan view of a left half of the front portion of the vehicle body, which is illustrated in FIG. 1.

Referring to FIG. 3 also, the left and right front side frames 14, 14 have at least respective three yielding portions on the left and right sides, which are left and right front side yielding portions 21, 21, left and right intermediate yielding portions 22, 22 that are separately positioned in the rear of the left and right front side yielding portions 21, 21, and left and right rear side yielding portions 23, 23 that are separately positioned in the rear of the left and right intermediate yielding portions 22, 22.

The left and right side frames 14, 14 bow toward a vehicle width central side from the left and right intermediate yielding portions 22, 22 toward the left and right rear side yielding portions 23, 23. Thus, the left and right rear side yielding portions 23, 23 are positioned on the inside of the left and right front side yielding portions 21, 21 and the left and right intermediate yielding portions 22, 22 in the vehicle width direction.

The left and right front side yielding portions 21, 21 are portions that are folded so as to protrude inward in the vehicle width direction due to a collision load which is applied from a front position to a front end of the vehicle body 11 and thereby absorb collision energy. The left and right rear side yielding portions 23, 23 are energy absorbing portions that are folded outward in the vehicle width direction due to the collision load and may thereby absorb the collision energy. The left and right intermediate yielding portions 22, 22 are fold assisting portions that may be folded outward in the vehicle width direction so as to allow the left and right front side yielding portions 21, 21 and the left and right rear side yielding portions 23, 23 to be folded.

Thus, in the left and right front side frames 14, 14, three kinds of yielding portions, which are the left and right front side yielding portions 21, 21, the left and right intermediate yielding portions 22, 22, and the left and right rear side yielding portions 23, 23, perform folding deformation due to the collision load that is transmitted from the front bumper beam 16 via the left and right bumper beam extensions 17, 17. Those three kinds of yielding portions are folded, and an absorption amount of the collision energy may thereby be increased.

As illustrated in FIGS. 1 and 2, the left and right front upper members 15, 15 are positioned on the outside of the left and right front side frames 14, 14 in the vehicle width direction and extend from the left and right front pillars 13 while curving forward and downward. Left and right wheel houses 34, 34 and left and right front dumper housings 35, 35 are spanned and joined between the left and right front side frames 14, 14 and the left and right front upper members 15, 15.

The left and right front upper members 15, 15 are formed with left and right upper members 31, 31 and left and right lower members 32, 32. The left and right upper members 31, 31 are positioned on the outside in the vehicle width direction and on an upper side of the left and right side frames 14, 14 and extend forward from the left and right front pillars 13.

Here, the left front upper member 15 will be described in detail. The right front upper member 15 has the same configuration as the left front upper member 15 except that the right front upper member 15 is in the bilaterally symmetrical relationship with the left front upper member 15, the same reference characters will thus be given to components, and descriptions thereof will not be made.

Figure 4:
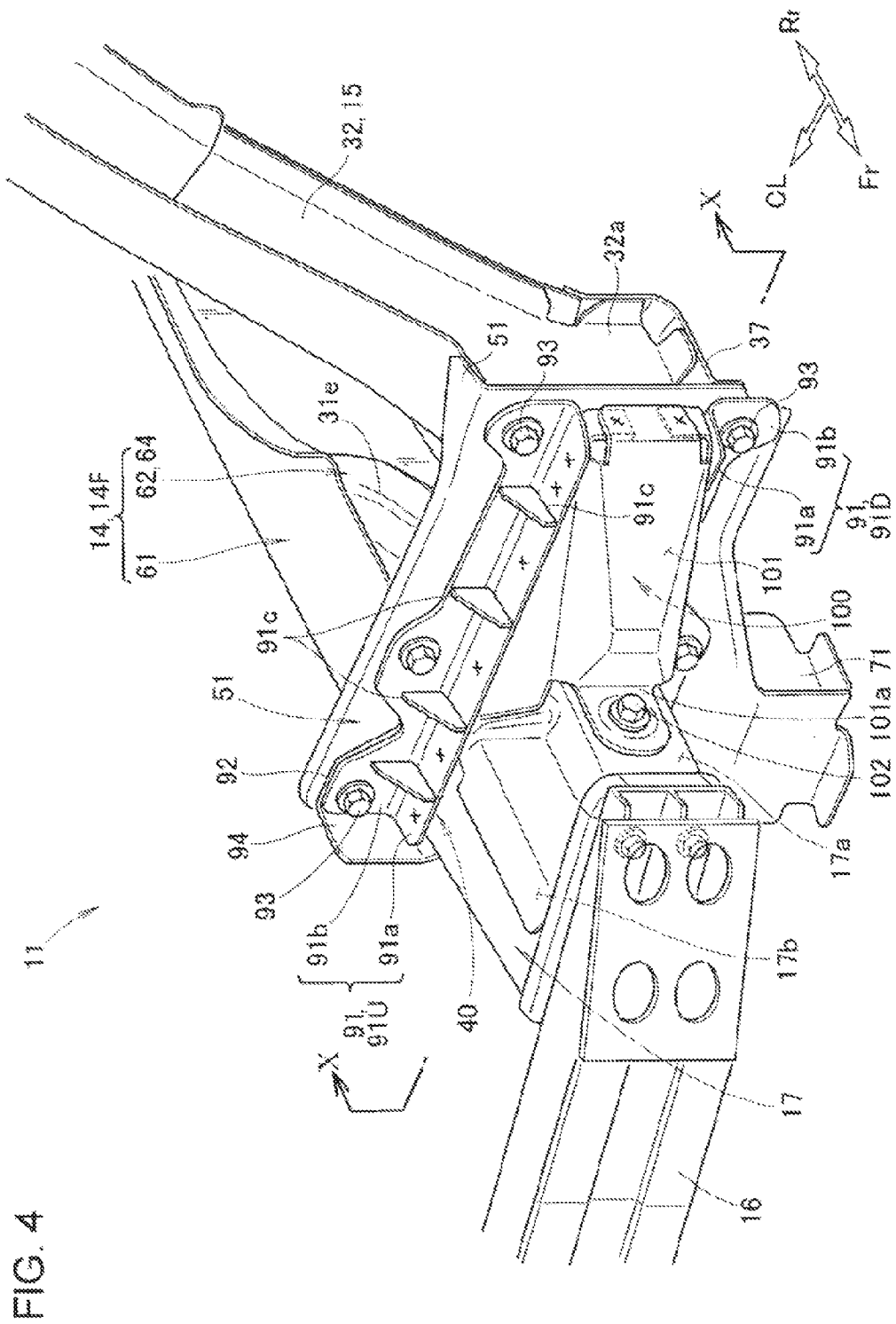
FIG. 4 is a perspective view of a left side portion of the front portion of the vehicle body, which is illustrated in FIG. 3, as seen from front above.

Referring to FIG. 4 also, the left lower member 32 extends from a front end portion of the left upper member 31 while curving forward and downward and further extends downward almost vertically. When the vehicle body 11 is seen in the vehicle width direction, a front lower end portion 32a of the left lower member 32 is positioned in the vicinity of a front end of the left front side frame 14.

The left front upper member 15 may be in a configuration in which the left upper member 31 and the left lower member 32 are integrally formed. The front lower end portion 32a of the left lower member 32 will appropriately be rephrased as "the front lower end portion 32a of the left front upper member 15".

Figure 5:
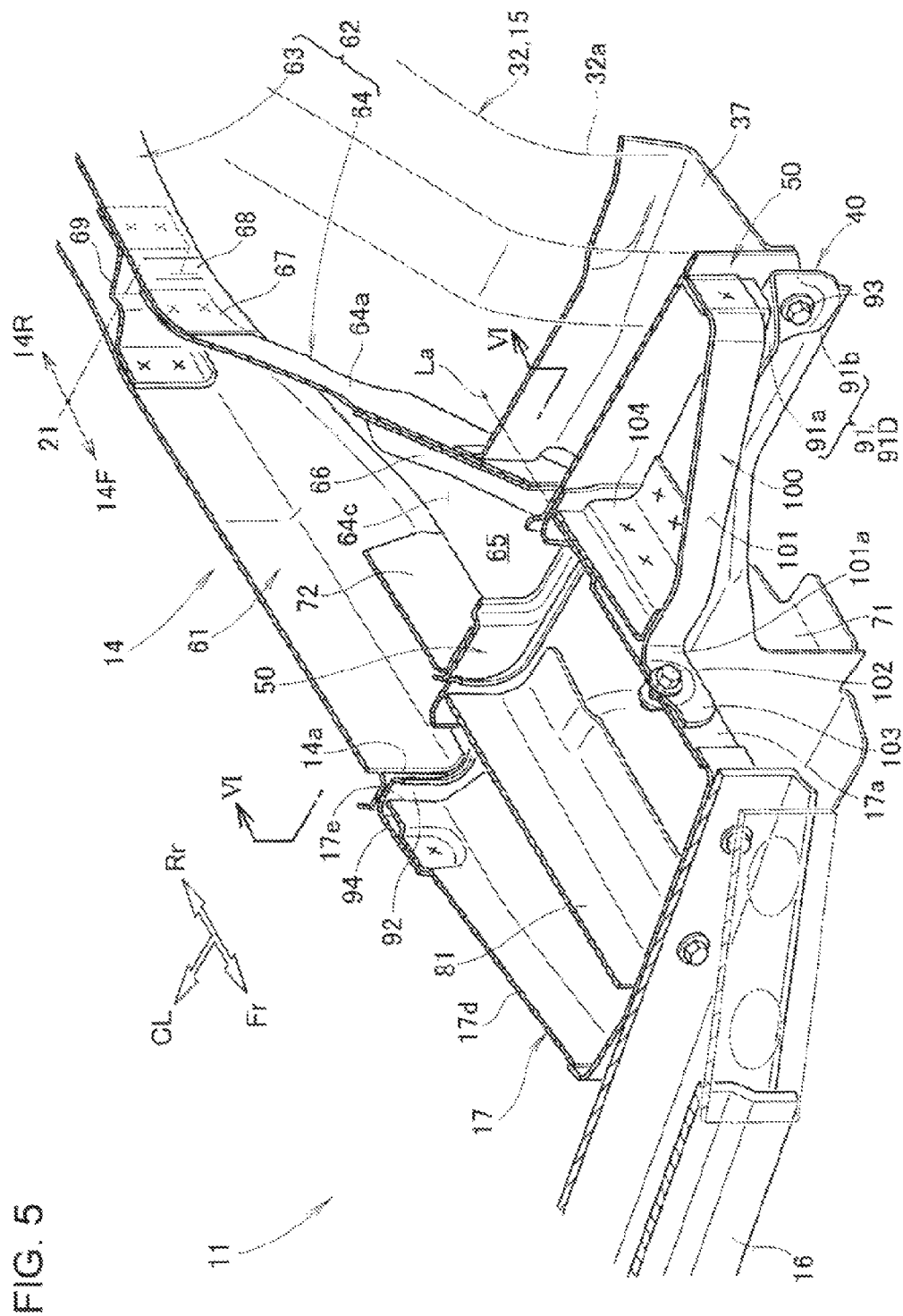
FIG. 5 is a perspective cross-sectional view of a left side portion of the front portion of the vehicle body, which is illustrated in FIG. 4, as seen from front above.

Referring to FIG. 5 also, the front lower end portion 32a of the left front upper member 15 is coupled with the left front side frame 14 by a left side coupling member 37. That is, the left side coupling member 37 connects the front lower end portion 32a of the left front upper member 15 with a front end portion of the left front side frame 14.

Next, the front bumper beam 16 will be described. As illustrated in FIG. 1, the front bumper beam 16 is positioned at the front end of the vehicle body 11 and extends in the vehicle width direction, and is provided at front ends of the left and right front side frames 14, 14 by the left and right bumper beam extensions 17, 17. More in detail, the front bumper beam 16 curves such that a vehicle width central portion thereof is protruded forward when the vehicle body 11 is seen from above. In addition, front surfaces of both end portions of the front bumper beam 16 are inclined in a rearward direction of the vehicle body as the front surfaces extend outward in the vehicle width direction.

The left and right bumper beam extensions 17, 17 extend rearward from both end portions of the front bumper beam 16 in the longitudinal direction. The left and right bumper beam extensions 17, 17 are members that deform due to the collision load in a case where a collision occurs to the front portion of the vehicle body 11, absorb a portion of the collision energy, and transmit the collision load from the front bumper beam 16 to the left and right front side frames 14, 14.

As illustrated in FIGS. 1 and 4, left and right extension side mount members 40, 40 are provided at rear ends of the left and right bumper beam extensions 17, 17. Meanwhile, left and right frame side mount members 50, 50 are provided at the front ends of the left and right front side frames 14, 14. Thus, rear ends of the left and right extension side mount members 40, 40 may be coupled with the front ends of the left and right front side frames 14, 14, that is, the left and right frame side mount members 50, 50 by plural bolts 93 (see FIG. 4). The left and right extension side mount members 40, 40 may be detached from the left and right frame side mount members 50, 50 by removing the plural bolts 93.

In the description made below, the left and right front side frames 14, 14 will appropriately be abbreviated as "left and right side frames 14, 14". The front bumper beam 16 will appropriately be abbreviated as "bumper beam 16". The left and right bumper beam extensions 17, 17 will appropriately be abbreviated as "extensions 17, 17".

Next, the left side frame 14 will be described in detail. The right side frame 14 has the same configuration as the left side frame 14 except that the right side frame 14 is in the bilaterally symmetrical relationship with the left side frame 14, the same reference characters will thus be given to components, and descriptions thereof will not be made.

As illustrated in FIGS. 3 and 5, the left side frame 14 is formed with a left side inner panel 61 on the inside in the vehicle width direction and a left side outer panel 62 on the outside in the vehicle width direction. The left side outer panel 62 is formed with a left rear portion outer panel 63 that is positioned in a rear half portion 14R of the left side frame 14 and a left front portion outer panel 64 that is positioned in a front half portion 14F of the left side frame 14.

A front end of the left side inner panel 61 and a front end of the left front portion outer panel 64 are joined to a rear surface of the left frame side mount member 50. The left frame side mount member 50 is a member substantially like a vertical plate, closes a whole surface of the front end of the left side frame 14, and extends outward in the vehicle width direction to the front of the front lower end portion 32a of the left front upper member 15.

Figure 6:
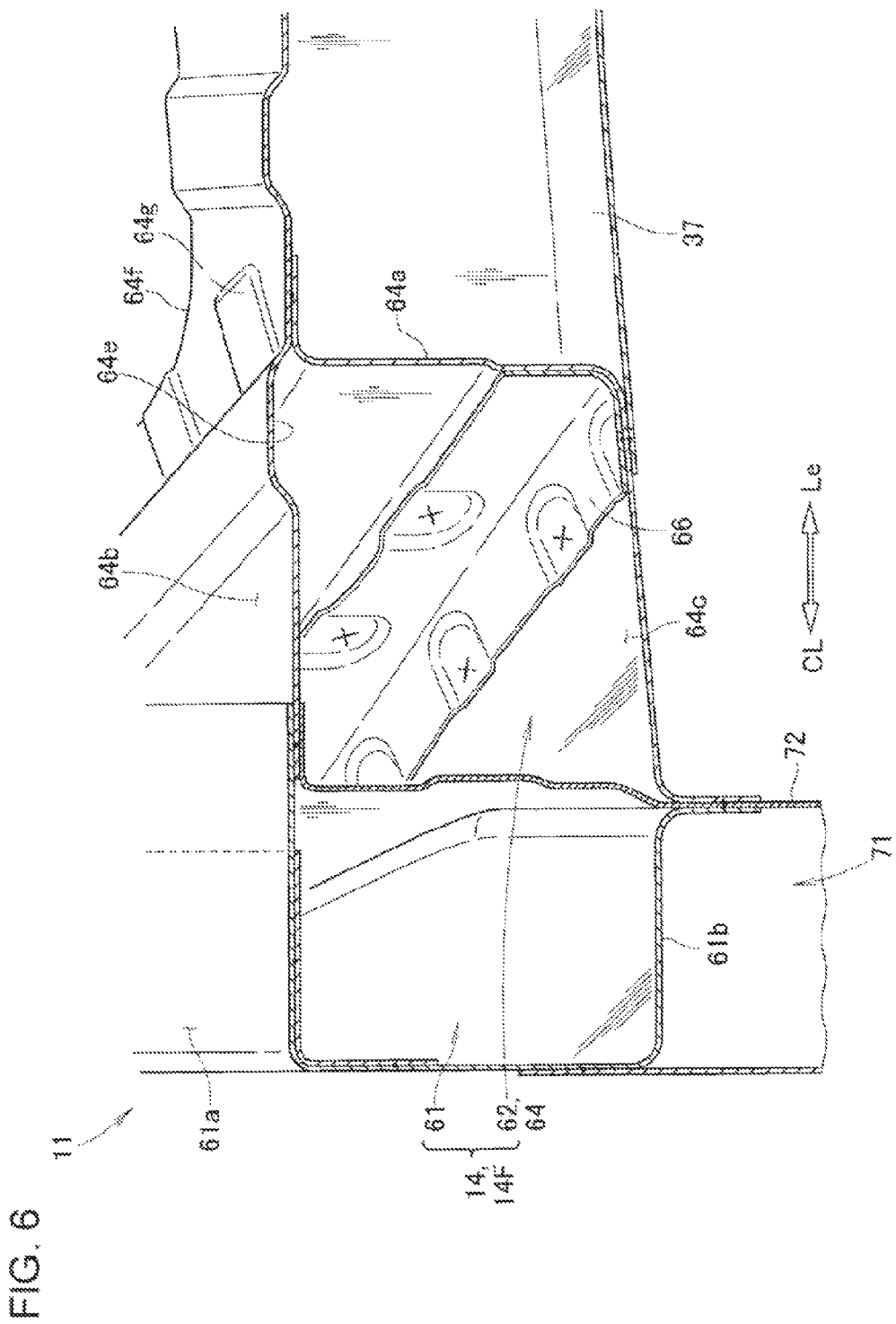
FIG. 6 is a perspective cross-sectional view taken along line VI-VI of FIG. 5.
Figure 7:
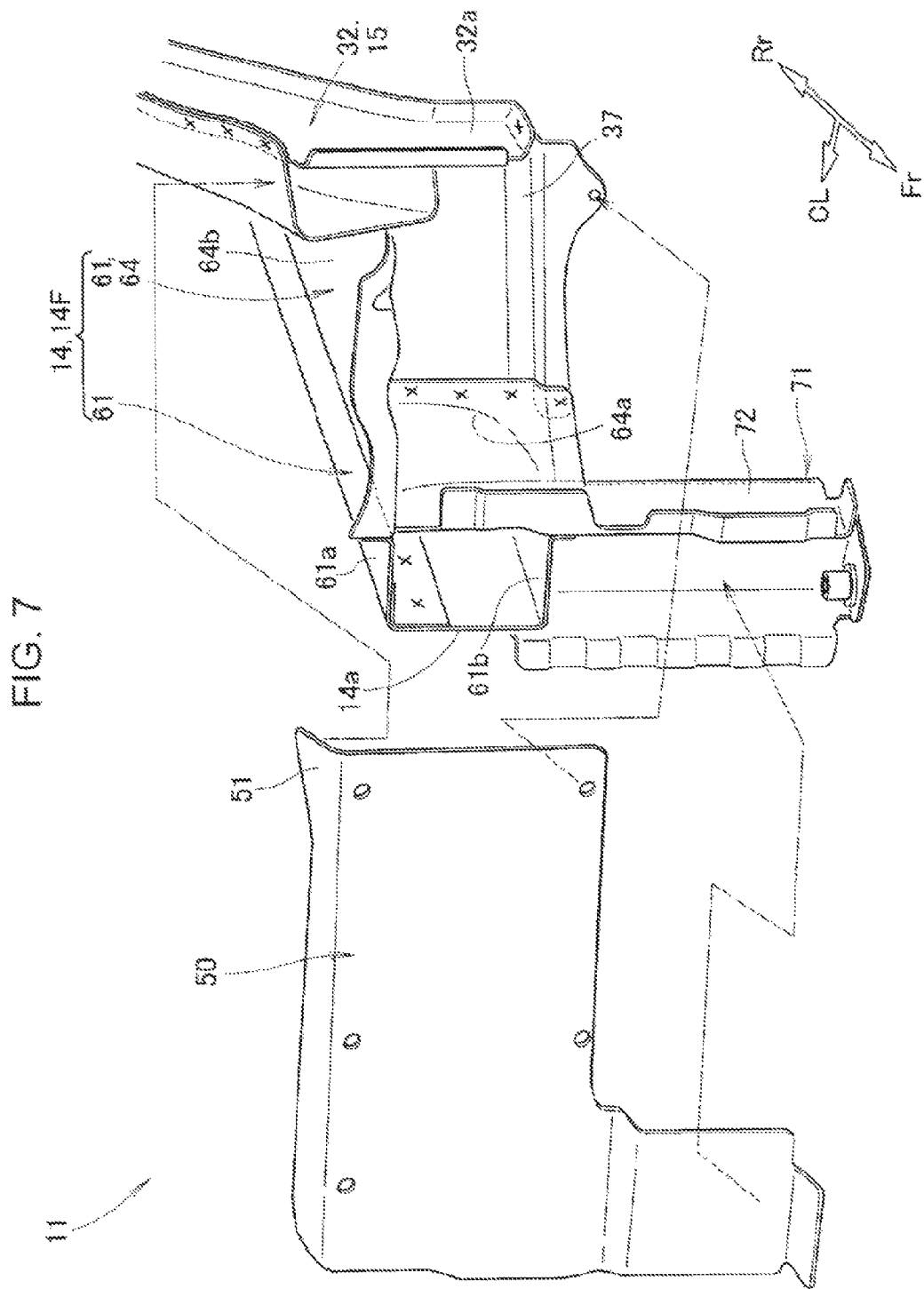
FIG. 7 is an exploded view of a configuration in which a left frame side mount member is detached from a front portion of a left front side frame illustrated in FIG. 4.

As illustrated in FIGS. 5 to 7, the left side inner panel 61 is configured to have a substantially U-shaped cross section in a front view, which is open outward in the vehicle width direction. The left rear portion outer panel 63 is configured to have a substantially U-shaped cross section in a front view, which is open inward in the vehicle width direction. The rear half portion 14R of the left side frame 14 is a structure that is formed with the left side inner panel 61 and the left rear portion outer panel 63 and has a rectangular closed cross section.

The left front portion outer panel 64 is formed with a left side plate 64a like a vertical plate, a left upper plate 64b like a horizontal plate, which extends in the vehicle width direction from an upper end of the left side plate 64a, and a left lower plate 64c like a horizontal plate, which extends in the vehicle width direction from a lower end of the left side plate 64a.

At least either one of the left upper plate 64b and the left lower plate 64c is configured with a different member from the left side plate 64a. For example, the left upper plate 64b is configured with a different member from the left side plate 64a. The left lower plate 64c is integrally formed with the left side plate 64a. Note that the left lower plate 64c may be configured with a different member from the left side plate 64a. Alternatively, both of the left upper plate 64b and the left lower plate 64c may be configured with different members. Those different members are joined to the left side plate 64a by welding such as spot welding.

The left side plate 64a is configured to extend forward from a front end of the left rear portion outer panel 63 while being inclined outward in the vehicle width direction and to be joined to the left frame side mount member 50. As a result, a left gusset structure 65 in a triangular shape in a plan view is configured with the left frame side mount member 50, the left side inner panel 61, and the left front portion outer panel 64. The left gusset structure 65 swells outward in the vehicle width direction from the front end portion of the left side frame 14.

As described above, at least either one of the left upper plate 64b and the left lower plate 64c is configured with a different member from the left side plate 64a. Thus, although the front end of the left front portion outer panel 64 is configured to be displaced outward in the vehicle width direction with respect to the left side inner panel 61, the left side frame 14 is highly processable.

For example, in a case where both of the left upper plate 64b and the left lower plate 64c are integrally formed with the left side plate 64a, the left front portion outer panel 64 is formed by a drawing process of a single plate material. Differently, in this embodiment, at least either one of the left upper plate 64b and the left lower plate 64c is configured with a different member from the left side plate 64a. Thus, the left front portion outer panel 64 may easily be formed by a bending process and joining even if the depth is too deep for the drawing process.

More in detail, the left upper plate 64b is configured to extend inward in the vehicle width direction from the upper end of the left side plate 64a and to be joined to an upper plate 61a of the left side inner panel 61. More specifically, the left upper plate 64b has a configuration in which the left upper plate 64b extends inward and outward in the vehicle width direction with respect to the upper end of the left side plate 64a, an inner end of the left upper plate 64b in the vehicle width direction is joined to the upper plate 61a of the left side inner panel 61, and an outer end of the left upper plate 64b in the vehicle width direction is joined to the left lower member 32. The left lower plate 64c is configured to extend inward in the vehicle width direction from the lower end of the left side plate 64a and to be joined to a lower plate 61b of the left side inner panel 61.

A surface in the left front portion outer panel 64, the surface being opposed to the left side inner panel 61, is provided with a left stiffening plate 66 for reinforcement. The left front portion outer panel 64 is reinforced by the left stiffening plate 66 and thus has enhanced rigidity. Thus, in a case where a narrow offset collision on the left side occurs to the front portion of the vehicle body 11, the front portion outer panel 64 is less subject to bending deformation and further less likely to collapse in the longitudinal direction. Accordingly, the collision load may more certainly and efficiently be transmitted from the front portion outer panel 64 to the rear half portion 14R of the left side frame 14. The rear half portion 14R of the left side frame 14 may further sufficiently absorb the collision energy.

The left stiffening plate 66 is provided on at least either one of a corner between the left side plate 64a and the left upper plate 64b and a corner between the left side plate 64a and the left lower plate 64c. For example, the left stiffening plate 66 is a member whose cross section is substantially L-shaped and which is joined to the corner between the left side plate 64a and the left lower plate 64c. The left stiffening plate 66 preferably extends from the front end of the front portion outer panel 64 to the vicinity of a rear end.

A corner portion (a ridge line portion of the left front portion outer panel 64 in the longitudinal direction) in the left front portion outer panel 64 basically has high rigidity compared to the other portions and thus facilitates transmission of the collision load in the longitudinal direction of the left front portion outer panel 64. That is, a much collision load is easily transmitted. The rigidity of the corner portion with high rigidity may further be enhanced by the left stiffening plate 66 in a small size.

As illustrated in FIG. 5, the left side outer panel 62 has a "left joined portion 67" that is formed by superposing a front end portion of the left rear portion outer panel 63 on a rear end portion of the left front portion outer panel 64 and by joining those together and has a "left fragile portion 68" that is provided in the vicinity of the left joined portion 67. The left fragile portion 68 is configured with the left front side yielding portion 21.

The left joined portion 67 in the left side outer panel 62 has higher rigidity than the other parts. Meanwhile, the left fragile portion 68 in the left side outer panel 62 has lower rigidity than the other parts. The rigidity is largely different between the left joined portion 67 and the left fragile portion 68. Because there is a significant rigidity different between the left joined portion 67 and the left fragile portion 68, in a case where a collision (including full-lap collisions in addition to narrow offset collisions) occurs to the front portion of the vehicle body 11, the left fragile portion 68 may certainly be folded. Accordingly, the left side frame 14 may more certainly absorb the collision energy.

In addition, as described above, the left side outer panel 62 has the left joined portion 67 with high rigidity. Thus, the rigidity of the left side frame 14 is enhanced. Even in a case where vibrations of wheels due to a travel road surface and vibrations from an engine are transmitted to the left side frame 14, vibrations of the left side frame 14 may be reduced. Thus, noise and vibration (NV) performance of the whole vehicle 10 may be enhanced.

As illustrated in FIG. 5, an internal portion of the left side frame 14 is partitioned into front and rear portions by a left bulkhead 69 that is provided between the left side inner panel 61 and the left rear portion outer panel 63. Thus, the rigidity of a position where the left bulkhead 69 is provided in the left side frame 14 may be enhanced.

Further, the left bulkhead 69 is positioned in the rear of the left fragile portion 68 and in the vicinity of the left fragile portion 68. Thus, in a case where a collision (including full-lap collisions in addition to narrow offset collisions) occurs to the front portion of the vehicle body 11, the left fragile portion 68 in the left side outer panel 62 may certainly be folded.

Figure 9:
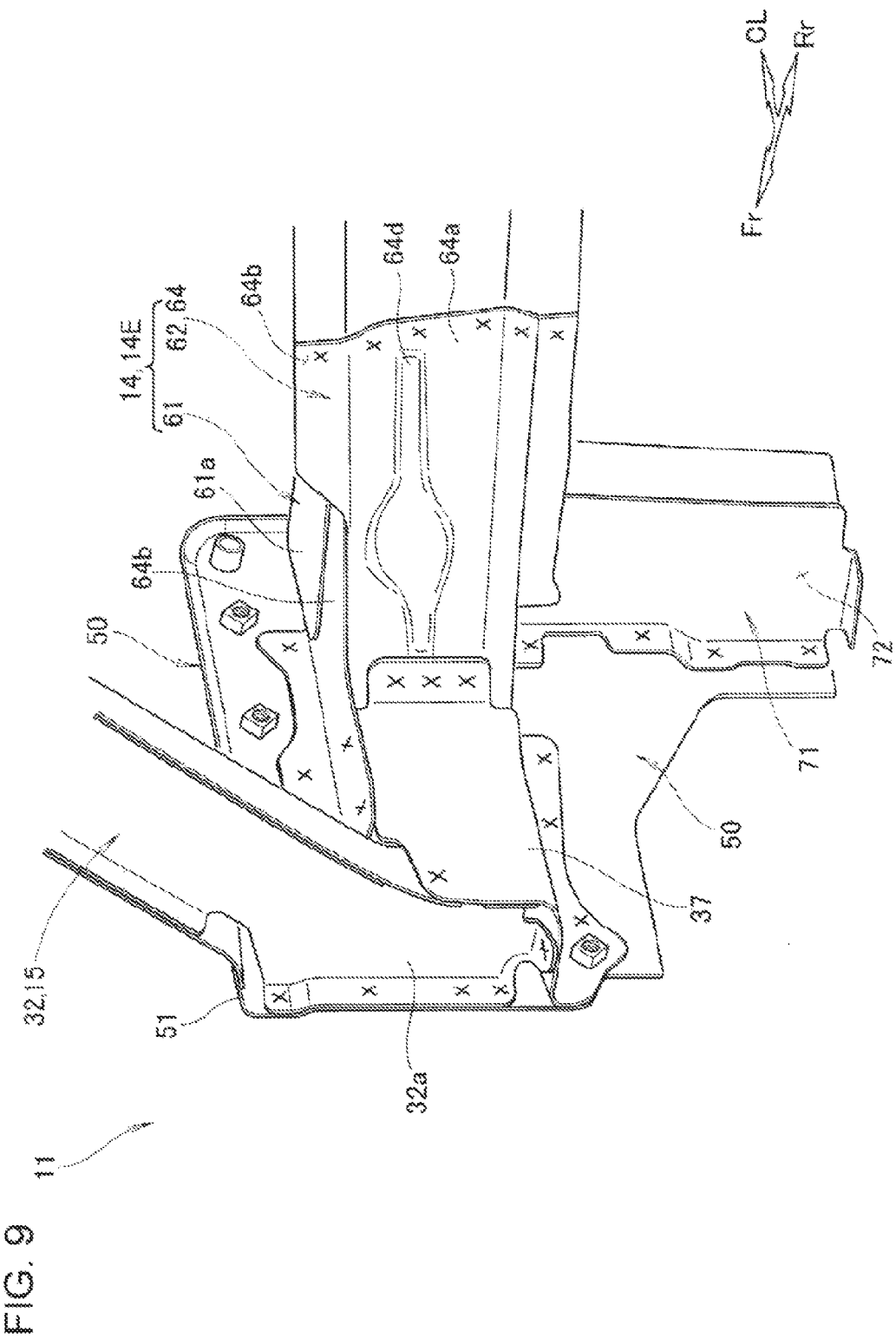
FIG. 9 is a perspective view of the left side portion of the front portion of the vehicle body, which is illustrated in FIG. 4, as seen from rear above on a left side in a vehicle width direction.

As illustrated in FIG. 9, the left side plate 64a in the left front portion outer panel 64 has a left bead 64d for the side plate 64a, which is formed on a plate surface. The left bead 64d for the side plate 64a is thin and long in the vehicle body front-rear direction along the left side plate 64a. Thus, the bending deformation of the left side plate 64a in a plate surface direction may be inhibited. That is, the rigidity of the left side plate 64a may be enhanced. Accordingly, in a case where a narrow offset collision occurs to a left side of the front portion of the vehicle body 11, a much collision load is easily transmitted from the left side plate 64a to the rear half portion 14R of the left side frame 14. The rear half portion 14R of the left side frame 14 may sufficiently absorb the collision energy.

Figure 8:
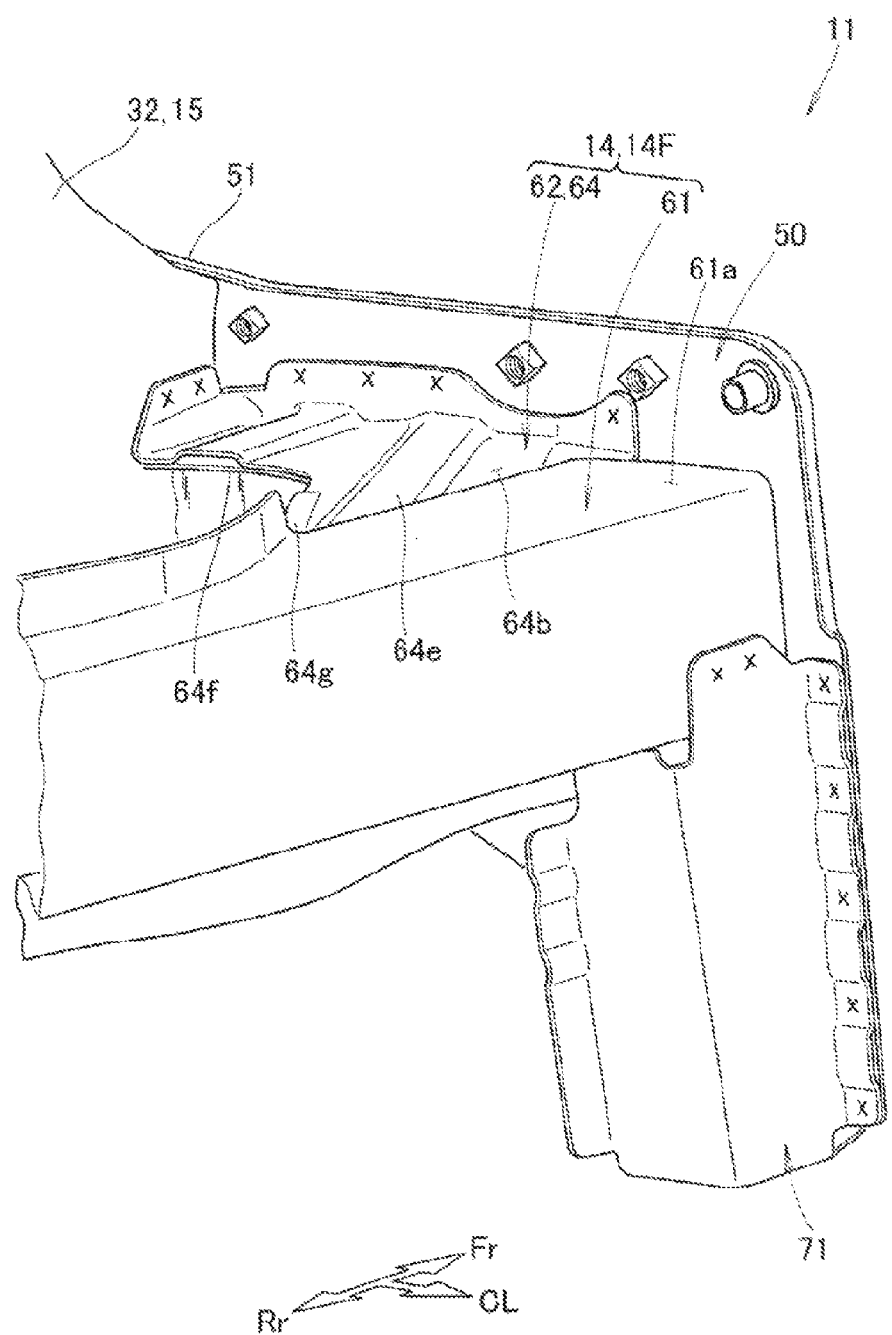
FIG. 8 is a perspective view of the left side portion of the front portion of the vehicle body, which is illustrated in FIG. 4, as seen from rear above on a vehicle width central side.

As illustrated in FIGS. 3, 6, and 8, the left upper plate 64b in the left front portion outer panel 64 has a left bead 64e for the upper plate 64b, which is formed on a plate surface. The left bead 64e for the upper plate 64b is thin and long in an extending direction of the left side plate 64a. Thus, the bending deformation of the left upper plate 64b in the plate surface direction may be inhibited. That is, the rigidity of the left upper plate 64b may be enhanced. Accordingly, in a case where a narrow offset collision occurs to the left side of the front portion of the vehicle body 11, a much collision load is easily transmitted from the left upper plate 64b to the rear half portion 14R of the left side frame 14. The rear half portion 14R of the left side frame 14 may sufficiently absorb the collision energy.

Figure 10:
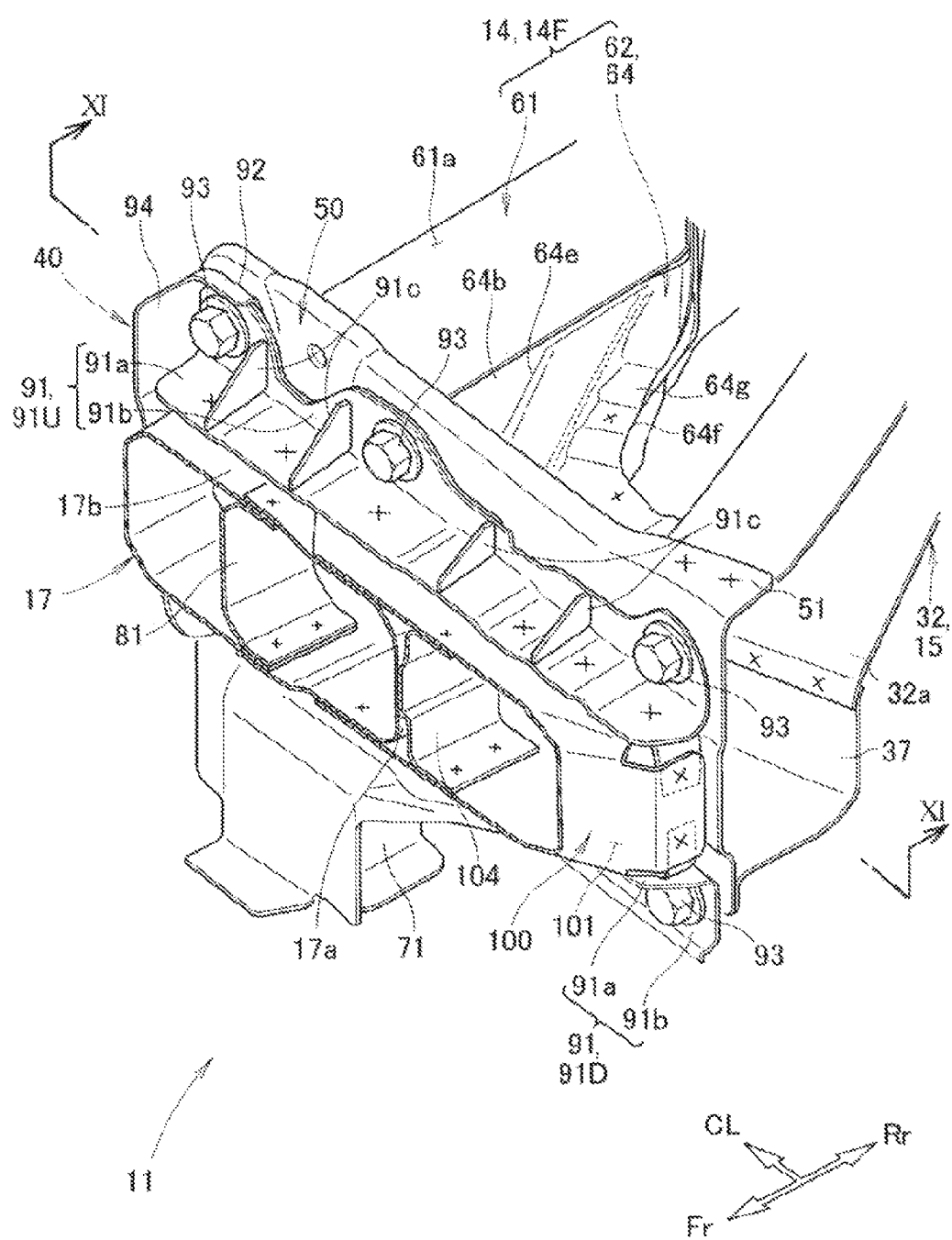
FIG. 10 is a perspective cross-sectional view taken along line X-X of FIG. 4.

In addition, as illustrated in FIGS. 6 and 10, the left upper plate 64*b* has a left uneven (concave-convex) portion 64*g* that is undulated in the plate surface direction in an edge portion 64*f* on the outside in the vehicle width direction. The left uneven portion 64*g* is successively undulated along the edge portion 64*f*. Thus, intermittent gaps along the left uneven portion 64*g* are provided between the upper end of the left side plate 64*a* and a lower surface of the left upper plate 64*b*. In a painting step of the vehicle body, an electrodeposition liquid may be infiltrated from the gaps into a space between the left side inner panel 61 and the left side outer panel 62. As a result, an anti-rust process for the vehicle body 11 may further sufficiently be carried out.

As illustrated in FIGS. 2 and 7, the vehicle body 11 has left and right subframe mount brackets 71 that extend downward from the front ends of the left and right side frames 14. Front end portions of a subframe 73 may be mounted on lower ends of the left and right subframe mount brackets 71. Rear end portions of the subframe 73 may be mounted on lower ends of rear end portions of the left and right side frames 14. The subframe 73 is a component on which a driving unit such as an engine is mounted. The right subframe mount bracket, which is not illustrated, has a configuration in the bilaterally symmetrical relationship with the left subframe mount bracket 71, and a description thereof will thus not be made.

A cross section of the left subframe mount bracket 71 as seen from above is in a general U-shape in which a front side is open. An open end on the front side of the left subframe mount bracket 71 is configured to be closed by a left frame side mount member 50 and to be joined to the left frame side mount member 50.

As described above, the open end is closed by the left frame side mount member 50, and the left subframe mount bracket 71 with the general U-shaped cross section is thereby configured to have a closed cross section. As described above, the left frame side mount member 50 is provided at the front end of the left side frame 14. Thus, the rigidity of the left subframe mount bracket 71 may be enhanced.

As illustrated in FIG. 6, a side plate 72 on the outside in the vehicle width direction in the left subframe mount bracket 71 is interposed (inserted) between a side surface of the left side inner panel 61 on the outside in the vehicle width direction and a side surface of the left front portion outer panel 64 on the inside in the vehicle width direction and joined to the side surfaces and extends to an upper end of the left side inner panel 61 and is joined thereto.

Thus, the rigidity of a base end of the left subframe mount bracket 71 on an upper side may be enhanced. Vibrations of the wheels due to the travel road surface and vibrations from the engine are transmitted from the subframe 73 (see FIG. 2) to both of the left side inner panel 61 and the left front portion outer panel 64 via the left subframe mount bracket 71, and vibrational energy may thereby be dispersed. Thus, the NV performance of the whole vehicle 10 may be enhanced.

Next, the left extension 17 will be described in detail. The right extension 17 has the same configuration as the left extension 17 except that the right extension 17 is in the bilaterally symmetrical relationship with the left extension 17, the same reference characters will thus be given to components, and descriptions thereof will not be made.

Figure 11:
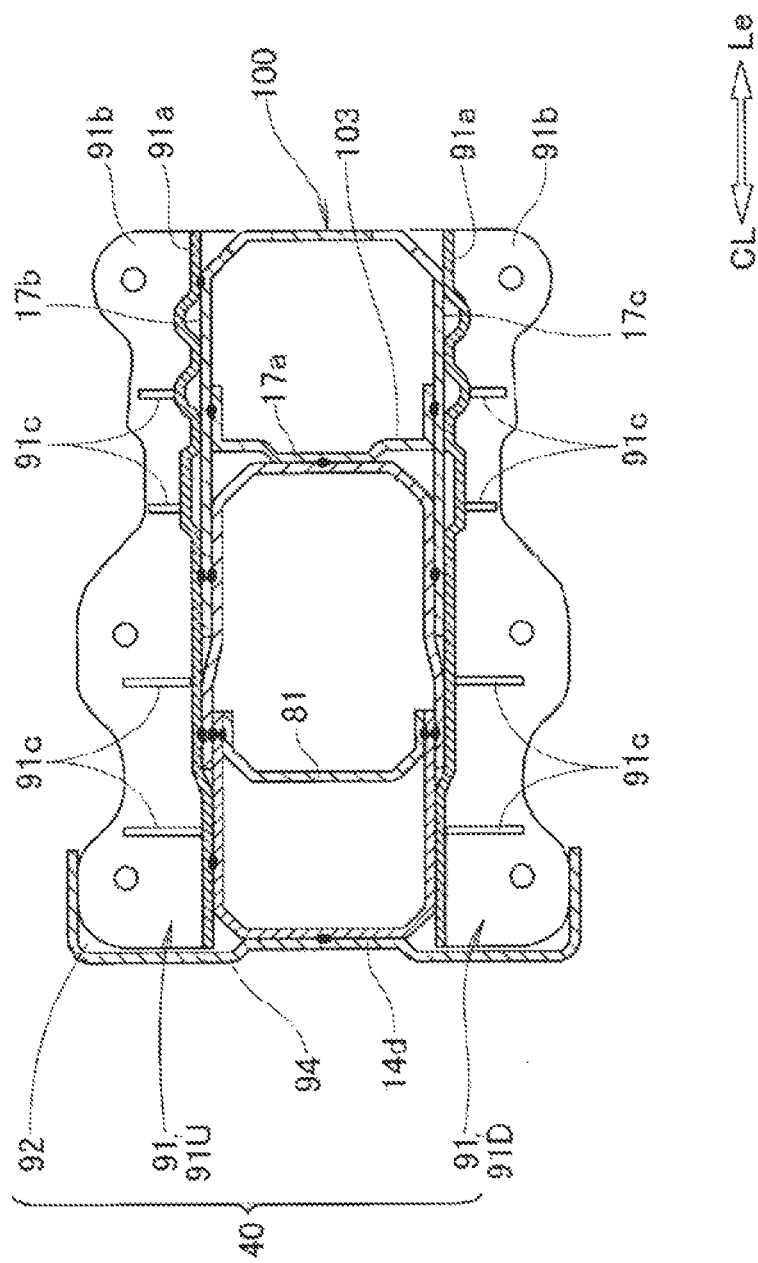
FIG. 11 is a cross-sectional view taken along line XI-XI of FIG. 10.

As illustrated in FIGS. 5, 10, and 11, the left extension 17 is configured to have a closed cross section in a horizontally long rectangular shape when the vehicle body 11 is seen from the front and to be in a general rectangular shape in a plan view. When the vehicle body 11 is seen from a front position, a rear end 17*e* of an inner surface of the left extension 17 in the vehicle width direction corresponds with (e.g., is aligned with) an inner surface of the left side frame 14 in the vehicle width direction.

Meanwhile, when the vehicle body 11 is seen from a front position, a rear end of an outer surface of the left extension 17 in the vehicle width direction corresponds with (e.g., is aligned with) a front end of an outer surface of the left side frame 14 in the vehicle width direction. That is, when the vehicle body 11 is seen from above, the front end of the left side plate 64*a* of the left front portion outer panel 64 is positioned on a straight line La (see FIG. 5) in the front-rear direction that passes through an outer surface 17*a* of the left extension 17 in the vehicle width direction.

Thus, in a case where a narrow offset collision occurs to the left side of the front portion of the vehicle body 11, a collision load amount that is transmitted from the left extension 17 to the front portion outer panel 64 may be increased. Accordingly, the left side frame 14 may sufficiently absorb the collision energy.

A left reinforcement member 81 is provided in an internal portion of the left extension 17. The left reinforcement member 81 is a member like a vertical plate, which extends in the vehicle body front-rear direction from a front end to the rear end of the left extension 17. As illustrated in FIG. 5, the side surface of the left side inner panel 61 on the outside in the vehicle width direction and the side plate 72 on the outside in the vehicle width direction in the left subframe mount bracket 71 are positioned in the immediate rear of the left reinforcement member 81. Thus, in a case where a narrow offset collision occurs to the left side of the front portion of the vehicle body 11, the collision load amount that is transmitted from the left extension 17 to the front portion outer panel 64 may be increased. Accordingly, the left side frame 14 may sufficiently absorb the collision energy.

As illustrated in FIGS. 5, 10, and 11, the left extension side mount member 40 is formed with at least one left mount bracket 91 and a left bracket auxiliary portion 92 that is integrally provided with the left mount bracket 91.

The left mount bracket 91 is provided at the rear end of the left extension 17. The left mount bracket 91 is positioned on at least either one of an upper surface 17*b* and a lower surface 17*c* of the left extension 17. The left mount brackets 91 are more preferably positioned on both of the upper surface 17*b* and the lower surface 17*c* of the left extension 17.

In the description made below, in a case where the left mount brackets 91, 91 that are positioned in upper and lower positions are described separately, the left mount bracket 91 positioned on the upper surface 17*b* of the left extension 17 will appropriately be referred to as "left upper side mount bracket 91U". Further, the left mount bracket 91 positioned on the lower surface 17*c* of the left extension 17 will appropriately be referred to as "left lower side mount bracket 91D".

The left mount bracket 91 is configured with an L-shaped member, whose cross section as seen in the vehicle width direction is in a general L-shape, and extends in the vehicle width direction in a thin and long shape. This left L-shaped member 91 (the left mount bracket 91) is formed with a left joined plate portion 91*a* like a horizontal plate and a left flange 91b like a vertical plate, which extends in the up-down direction from a rear end of the left joined plate portion 91a. The left joined plate portion 91a is configured to be joined to the left extension 17 by welding such as spot welding. The left flange 91b is configured to be coupled with a front surface of the left frame side mount member 50 by the plural bolts 93 in a detachable manner.

Thus, at least one of the upper surface 17b and the lower surface 17c of the left extension 17 may be supported by the joined plate portion 91a, like a horizontal plate, of the left L-shaped member 91 (the left mount bracket 91). Accordingly, the supporting rigidity of the left extension 17 by the left side frame 14 may be enhanced. As a result, vibrations in the up-down direction of the bumper beam 16 may be reduced. Thus, the noise and vibration (NV) performance of the whole vehicle 10 may be enhanced.

Further, the left joined plate portion 91a like a horizontal plate is joined to at least either one of the upper surface 17b and the lower surface 17c of the left extension 17. Accordingly, the joint strength of a joining portion at which stresses are concentrated and in which the left joined plate portion 91a is joined to the left extension 17 may be enhanced.

As illustrated in FIGS. 10 and 11, plural ribs 91c like vertical plates are configured to be integrally formed with a corner between the left joined plate portion 91a and the left flange 91b. Thus, the corner of the left mount bracket 91 in the L-shape may be reinforced by the ribs 91c. Accordingly, the supporting rigidity of the left extension 17 by the left side frame 14 may further be enhanced. As a result, the vibrations in the up-down direction of the bumper beam 16 may further be reduced. Thus, the NV performance of the whole vehicle 10 may further be enhanced.

As illustrated in FIG. 10, at least the left mount bracket 91 in the left extension side mount member 40 and the left frame side mount member 50 extend to the outside in the vehicle width direction of the position of the left extension 17. The left mount bracket 91 is configured to be joined to the front lower end portion 32a of the left front upper member 15 via the left frame side mount member 50.

Thus, in a case where a narrow offset collision on the left side occurs to the bumper beam 16, the collision load may be transmitted from the left extension 17 to the front lower end portion 32a of the left front upper member 15 via the left mount bracket 91 and the left frame side mount member 50. Accordingly, the collision energy may also be absorbed by the left front upper member 15.

As illustrated in FIG. 10, the left frame side mount member 50 has a left rearward extending portion 51 that extends rearward from an upper end on the outside in the vehicle width direction. The left rearward extending portion 51 is configured to be joined to an upper surface of the front lower end portion 32a of the left front upper member 15. Thus, the joint rigidity of the left frame side mount member 50 to the front lower end portion 32a of the left front upper member 15 in a vehicle body up-down direction may be enhanced by the left rearward extending portion 51.

In a case where a narrow offset collision occurs to a right side of the front portion of the vehicle body 11, the bumper beam 16 is drawn to a collision side (the right side). In this case, the collision point of the narrow offset collision is not necessarily positioned at the center of the height of the front bumper beam. In a case where the collision point is offset from the center of the height of the bumper beam 16 in the up-down direction, a phenomenon may occur in which the bumper beam 16 is twisted in the up-down direction. Thus, an excessively large load in the vehicle body up-down direction may be applied to a joining portion of the left frame side mount member 50 to the front lower end portion 32a of the left front upper member 15 on the side that is positioned on the opposite side (the left side) to the collision point.

However, because the left rearward extending portion 51 is joined to the upper surface of the front lower end portion 32a of the left front upper member 15, the joint rigidity in the vehicle body up-down direction of the left frame side mount member 50 to the front lower end portion 32a of the left front upper member 15 may sufficiently be enhanced.

As illustrated in FIGS. 5 and 10, the left side coupling member 37 is configured to be positioned in the immediate rear of the left frame side mount member 50 and to be joined to the rear surface of the left frame side mount member 50. The left side coupling member 37 is formed to have a cross section in a general L-shape in a side view, which opens forward and upward, an opened front surface is joined to the rear surface of the left frame side mount member 50, and an opened upper surface is joined to the left upper plate 64b of the left front portion outer panel 64. As a result, a combining structure of the left side coupling member 37, the left frame side mount member 50, and the left upper plate 64b of the left front portion outer panel 64 is configured as a closed cross section in a side view.

Thus, in a case where a narrow offset collision occurs to the bumper beam 16, the collision load may be transmitted from the left extension 17 to the front lower end portion 32a of the left front upper member 15 also by the left side coupling member 37. Accordingly, the collision load amount that is transmitted from the left extension 17 to the front lower end portion 32a of the left front upper member 15 may be increased. Further, the left side coupling member 37 and the left frame side mount member 50 are combined together as a closed cross section in a side view. Accordingly, the supporting rigidity of the left extension 17 by the left side frame 14 and the left front upper member 15 may further be enhanced. As a result, the vibrations in the up-down direction of the bumper beam 16 may further be reduced. Thus, the NV performance of the whole vehicle 10 may further be enhanced.

Figure 12:
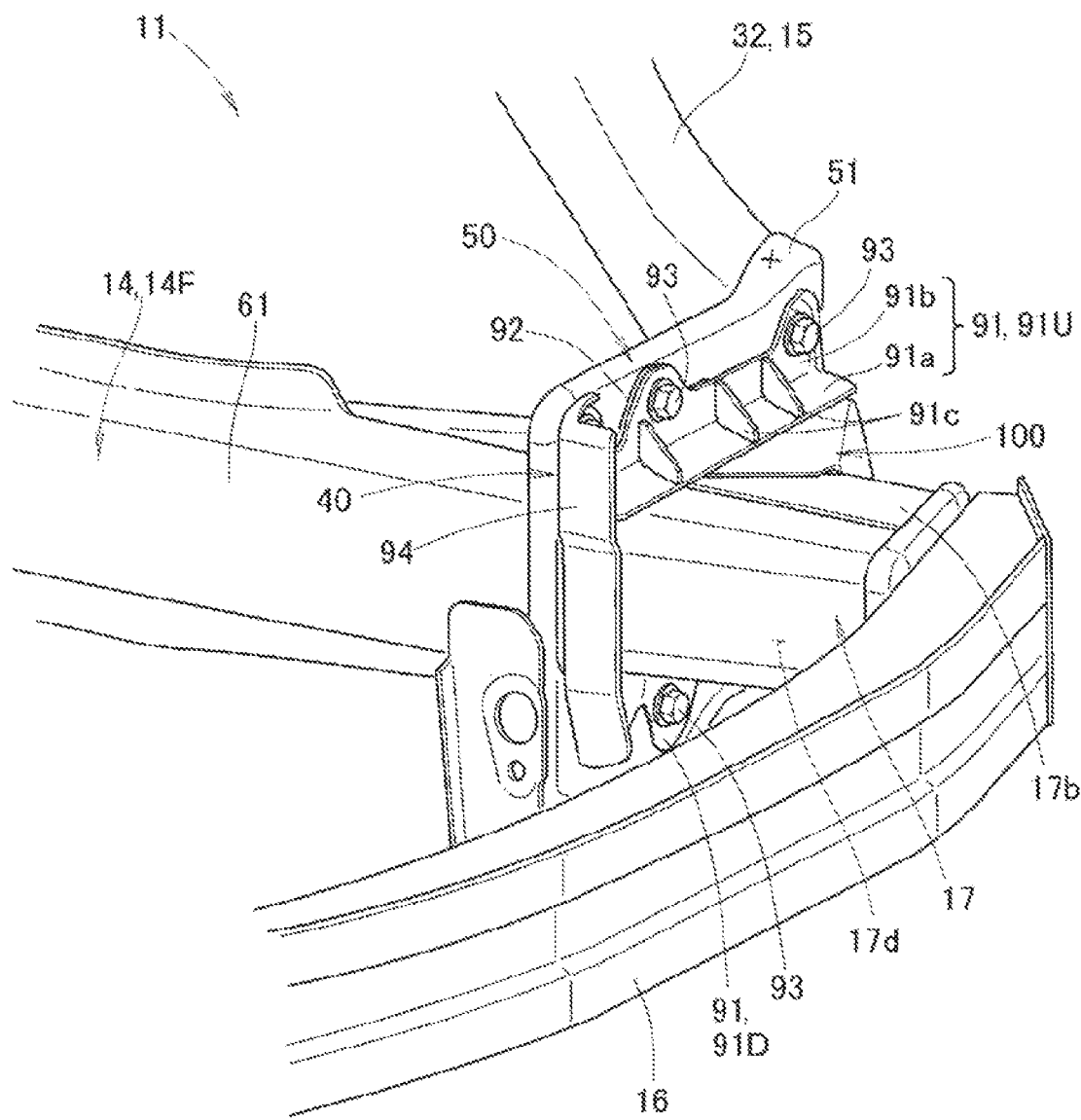
FIG. 12 is a perspective view of the left side portion of the front portion of the vehicle body, which is illustrated in FIG. 4, as seen from front above on the vehicle width central side.

As illustrated in FIGS. 5, 11, and 12, the left bracket auxiliary portion 92 in the left extension side mount member 40 is configured to be joined to rear surfaces of the left mount brackets 91, 91. More in detail, the left bracket auxiliary portion 92 is configured with a flat plate like a vertical plate, which is superposed on and joined to the rear surfaces of the left mount brackets 91, 91. The left bracket auxiliary portion 92 integrally connects the rear surface of the left flange 91b of the left upper side mount bracket 91U and a rear surface of the left flange 91b of the left lower side mount bracket 91D together.

The left bracket auxiliary portion 92 includes a configuration that is formed throughout the whole range in the height direction from an upper end of the left flange 91b of the left upper side mount bracket 91U to a lower end of the left flange 91b of the left lower side mount bracket 91D. Further, the range of the left bracket auxiliary portion 92 in the width direction covers at least a range from an inner surface 17d of the left extension 17 in the vehicle width direction to an outer surface 17a in the vehicle width direction. It is preferable that the width of the left bracket auxiliary portion 92 is substantially (basically) the same as the whole range of the width of the left frame side mount member 50.

A left extending portion 94 is integrally formed with an inner end of the left bracket auxiliary portion 92 in the vehicle width direction. The left extending portion 94 is a member like a vertical plate, which extends forward from the inner end of the left bracket auxiliary portion 92 in the vehicle width direction. As a result, the left extending portion 94 extends forward from inner ends of the left mount brackets 91, 91 in the vehicle width direction. The left extending portion 94 is configured to be joined to the inner surface 17*d* of the left extension 17 in the vehicle width direction. In other words, the left extension side mount member 40 is configured to be joined to the inner surface 17*d* in the vehicle width direction in a rear end portion of the left extension 17.

Thus, in a case where a narrow offset collision on the left side occurs to the bumper beam 16, particularly in a case where a collision occurs to a position on the outside in the vehicle width direction of the left bumper beam extension 17, the left extending portion 94 may support the left extension 17 such that the left extension 17 does not laterally buckle inward in the vehicle width direction (toward the vehicle width central portion). That is, lateral buckling of the left extension 17 with respect to the left side frame 14 may be restrained. Thus, compressive deformation of the left extension 17 due to the collision load may be facilitated. As a result, the left bumper beam extension 17 may sufficiently absorb the collision energy. Further, the collision load may efficiently be transmitted from the left extension 17 to the left side frame 14.

As illustrated in FIG. 1, left and right gussets 100, 100 are positioned on the outer surfaces 17*a*, 17*a* in the vehicle width direction in the rear end portions of the left and right extensions 17, 17. In the description made below, the left gusset 100 will be described in detail. The right gusset 100 has the same configuration as the left gusset 100 except that the right gusset 100 is in the bilaterally symmetrical relationship with the left gusset 100, the same reference characters will thus be given to components, and descriptions thereof will not be made.

As illustrated in FIGS. 4 and 5, a rear end of the left gusset 100 substantially contacts with a front surface of the left extension side mount member 40, particularly with a front surface of the left bracket auxiliary portion 92 (including a configuration with slight separation). Further, the left gusset 100 is configured to extend forward from the left extension side mount member 40, to contact with the outer surface 17*a* in the vehicle width direction in the rear end portion of the left extension 17, and to be joined thereto. That is, the left gusset 100 is provided on a left corner between the outer surface 17*a* in the vehicle width direction in the rear end portion of the left extension 17 and the left extension side mount member 40.

In a case where a narrow offset collision occurs to the front portion of the vehicle body 11, particularly in a case where a collision occurs to a position on the outside in the vehicle width direction of the left bumper beam extension 17, the left gusset 100 may directly receive the collision load. Thus, the left gusset 100 will also be referred to as load receiving member 100.

In addition, the strength of the left gusset 100 is higher than the strength of the left extension 17. An example of a configuration in which the strength of the left gusset 100 is higher than the strength of the left extension 17 is as follows. Here, a case where the left gusset 100 has a closed cross section will be described.

In a first example, the material of the left gusset 100 is the same as the material of the left extension 17. However, the plate thickness of the left gusset 100 is thicker than the plate thickness of the left extension 17. As a result, the left gusset 100 has higher strength.

In a second example, the plate thickness of the left gusset 100 is the same as the plate thickness of the left extension 17. However, the tensile strength of the material of the left gusset 100 is greater than the tensile strength of the material of the left extension 17. As a result, the left gusset 100 has higher strength.

In a third example, the left gusset 100 is reinforced by a reinforcement member (for example, the left reinforcement member 81 illustrated in FIG. 5). As a result, the left gusset 100 has higher strength.

A fourth example is a composite configuration in which any two or more of the first example, the second example, and the third example are combined together. As a result, the left gusset 100 has higher strength.

As illustrated in FIGS. 4 and 5, the left gusset 100 is configured to be joined to the front lower end portion 32*a* of the left front upper member 15 via the left extension side mount member 40. A front surface 101 of the left gusset 100 is inclined in the rearward direction of the vehicle body from the left extension 17 toward the outside in the vehicle width direction. As described above, the left gusset 100 is positioned on the left corner between the outer surface 17*a* in the vehicle width direction in the rear end portion of the left extension 17 and the left extension side mount member 40.

That is, the left gusset 100 is substantially formed in a general triangular shape in a plan view. Thus, in a case where the collision load of a narrow offset collision is applied to the left gusset 100, the collision load may efficiently be transmitted from the left gusset 100 to the front lower end portion 32*a* of the left front upper member 15. The left front upper member 15 in addition to the left side frame 14 may sufficiently absorb the collision energy.

As illustrated in FIGS. 4 and 5, the left gusset 100 may be joined to the left extension 17 by fastening using a bolt 102. More specifically, the left gusset 100 has a flange 103 that extends forward from a forefront end 101*a* (an inner end in the vehicle width direction and the front end 101*a*) of the front surface 101. The flange 103 is configured to be superposed on the outer surface 17*a* of the left extension 17 in the vehicle width direction and to be fastened thereto by a fastening member such as the bolt 102. The joining structure of the left gusset 100 to the left extension 17 includes both of use of the fastening structure by the fastening member such as the bolt 102 and use of welding.

As described above, the left extension 17 and the left gusset 100 may tightly be fastened together by the bolt 102. Accordingly, in a case where an inward bending moment occurs to the left extension 17 or a case where an outward bending moment occurs to the left gusset 100, detachment of the left gusset 100 from the left extension 17 may sufficiently be inhibited. Thus, in a case where an outward bending moment occurs to the left gusset 100, an outward bending moment is likely to occur to the left extension 17 also.

As illustrated in FIGS. 6, 10, and 11, the left gusset 100 is configured to have the closed cross section. A left stiffening plate 104 for reinforcement is provided in the vicinity of a portion in the left gusset 100, which is joined to the outer surface in the vehicle width direction in the rear end portion of the left extension 17, and in an internal portion of the left gusset 100.

Thus, the rigidity of a joining portion of the left gusset 100 to the rear end portion of the left extension 17 may be enhanced. The left gusset 100 is less likely to collapse with respect to the collision load of a narrow offset collision. Accordingly, the bending deformation and the compressive deformation of the left extension 17 and the left side frame 14 may further be facilitated. As a result, because the collision energy of a narrow offset collision may efficiently be absorbed by the left side frame 14, collision energy absorbing performance may further be enhanced.

The left extension side mount member 40 has a configuration in which the rear end portion of the left extension 17 and the left gusset 100 are interposed between an upper portion and a lower portion of the left extension side mount member 40. That is, the rear end portion of the left extension 17 and the left gusset 100 are configured to be interposed between the left upper side mount bracket 91U and the left lower side mount bracket 91D and to be joined thereto.

Thus, the supporting rigidity of support for the left extension 17 and the left gusset 100 by the left extension side mount member 40 may be enhanced. As a result, the vibrations in the up-down direction of the bumper beam 16 may be reduced. Accordingly, the noise and vibration (NV) performance of the whole vehicle 10 may be enhanced. Further, in a case where a collision occurs to the front portion of the vehicle body 11 and an upward or downward collision load is thereby applied to a left portion of the bumper beam 16, buckling of the left extension 17 and the left gusset 100 in the up-down direction may be inhibited.

As described above, the left gusset 100 contacts with the outer surface 17a in the vehicle width direction in the rear end portion of the left extension 17. The left mount brackets 91, 91, that is, the left upper side mount bracket 91U and the left lower side mount bracket 91D are configured to be positioned on both of the upper surface 17b and the lower surface 17c of the left extension 17. Accordingly, the joined plate portion 91a of the left upper side mount bracket 91U and the joined plate portion 91a of the left lower side mount bracket 91D are configured to be connected together by the left gusset 100.

As described above, the outer surface 17a in the vehicle width direction in the rear end portion of the left extension 17 contacts with the left gusset 100. In a case where a narrow offset collision occurs to the bumper beam 16, particularly in a case where a collision occurs to a position on the outside in the vehicle width direction of the left extension 17, the left gusset 100 may support the left extension 17 such that the left extension 17 does not laterally buckle outward in the vehicle width direction. Thus, the compressive deformation of the left extension 17 due to the collision load may be facilitated. As a result, the left extension 17 may sufficiently absorb the collision energy.

In addition, the joined plate portion 91a of the left upper side mount bracket 91U and the joined plate portion 91a of the left lower side mount bracket 91D are connected together by the left gusset 100. Thus, when the vehicle body 11 is seen from the front, a substantially closed cross section may be configured with the left joined plate portions 91a, 91a that are positioned on the upper and lower sides and the left gusset 100. Accordingly, the supporting rigidity of the left extension 17 by the left side frame 14 may further be enhanced. As a result, the vibrations in the up-down direction of the bumper beam 16 may further be reduced. Thus, the NV performance of the whole vehicle 10 may further be enhanced.

As illustrated in FIGS. 4 and 5, the left side coupling member 37 that is joined to the rear surface of the left frame side mount member 50 extends to the outside in the vehicle width direction of the position of the left extension 17.

The front lower end portion 32a of the left front upper member 15 is coupled to a front end portion of the left front portion outer panel 64 by both of the left side coupling member 37 and the left frame side mount member 50. Thus, in a case where a narrow offset collision on the left side occurs to the front portion of the vehicle body 11, folding deformation may be caused by drawing the front lower end portion 32a of the left front upper member 15 toward the front end portion of the left front portion outer panel 64. Accordingly, the collision energy may be absorbed by both of the left front upper member 15 and the front lower end portion 32a of the left front upper member 15, and an energy absorption amount may be increased. Further, in a case where a full-lap collision occurs to the front portion of the vehicle body 11, the collision load may be dispersed to both of the left and right side frames 14, 14 and the left and right front upper members 15, 15. The collision energy is dispersed to both of those and thereby may sufficiently be absorbed.

In addition, the left side coupling member 37 may reinforce the left gusset 100. That is, the left gusset 100 may sufficiently be supported from the rear side by the left side coupling member 37 in a case where an outward bending moment on the left side occurs. Accordingly, an outward bending moment for canceling an inward bending moment may sufficiently be generated. Further, the collision load may be dispersed from the left gusset 100 to the front end portion of the left side frame 14 and the front lower end portion 32a of the left front upper member 15.

Figure 13A:
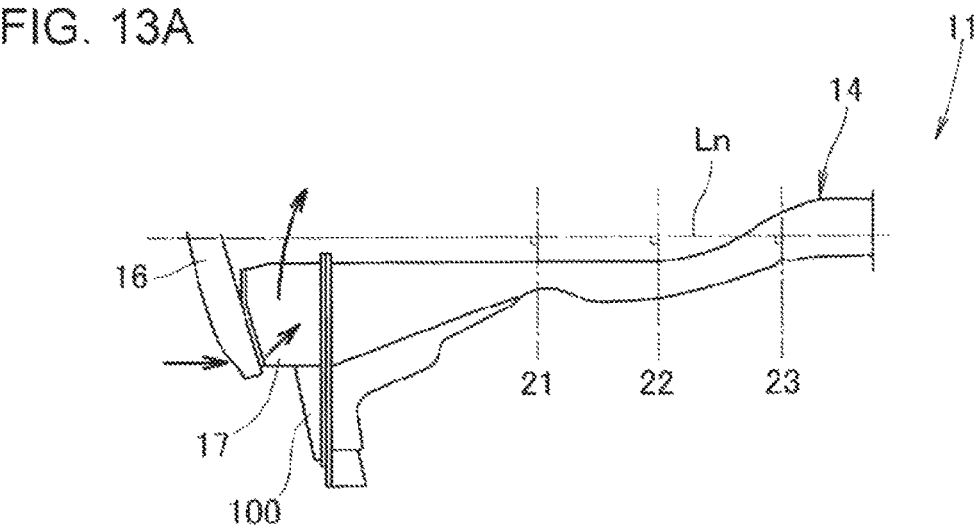
FIGS. 13A to 13C are effect explanation views of the front portion of the vehicle body, which is illustrated in FIG. 1.

Next, a description will be made about effects of the front portion of the vehicle in a case where the left and right gussets 100 are provided with reference to FIGS. 1 and 13A to 13C. FIG. 13A is a schematic view of a left front portion of the vehicle body 11 as seen from above and corresponds to FIG. 1. As illustrated in FIG. 13A, in a case where a narrow offset collision occurs to the left side of the front portion of the vehicle body 11, a load in the vehicle width direction from the left side (one end portion side) on which the collision occurs toward the right side (the other end portion), that is, a horizontal component force of the collision load is applied to the bumper beam 16. In an early period of the collision, a bending moment toward the vehicle width central side (inward bending moment) occurs to the left extension 17 and the left side frame 14 on a collision side. The left bumper beam extension 17 undergoes the compressive deformation.

Figure 13B:
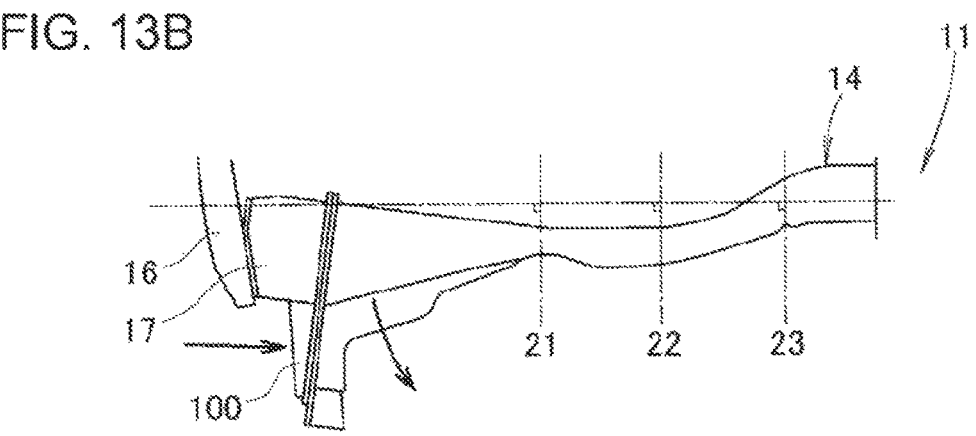

However, as illustrated in FIG. 1, the left and right gussets 100, 100 are positioned on left and right corners between the outer surfaces 17a, 17a in the vehicle width direction in the rear end portions of the left and right extensions 17, 17 and the left and right frame side mount members 50, 50. That is, the left and right gussets 100, 100 are positioned on the outside in the vehicle width direction of the left and right side frames 14, 14. Thus, the compressive deformation of the left extension 17 progresses, and as illustrated in FIG. 13B, the collision load thereby starts being applied to the left gusset 100 in an intermediate period of the collision.

As described above, the strength of the left gusset 100 is higher than the strength of the left extension 17. Accordingly, the left gusset 100 is less likely to collapse. The collision load from a front position of the vehicle body is applied to the left gusset 100, and a bending moment toward the outside in the vehicle width direction (outward bending moment) thereby occurs to the left extension 17 and the left side frame 14 on the collision side. The outward bending moment is exerted so as to cancel the inward bending moment. Further, the left and right gussets 100, 100 are joined to the outer surfaces 17a, 17a in the vehicle width direction in the rear end portions of the left and right extensions 17, 17. Thus, the outward bending moment is applied to bend the left extension 17 and the left side frame 14 outward (leftward) in the vehicle width direction via the left gusset 100.

Figure 13C:
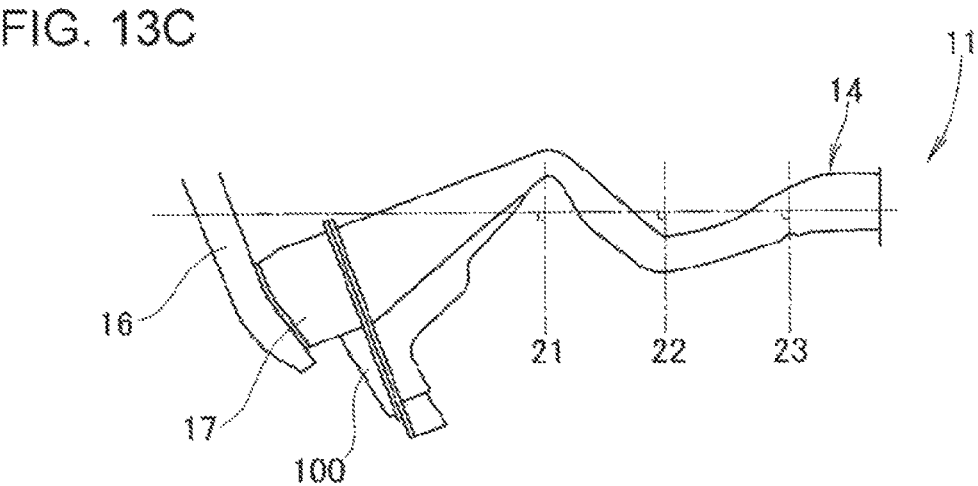

As described above, the collision load is applied to the left gusset 100, and as illustrated in FIG. 13C, the bending deformation and the compressive deformation of the left extension 17 and the left side frame 14 may thereby be facilitated. As a result, the collision energy of a narrow offset collision may efficiently be absorbed by the left front side frame 14.

The vehicle body front structure of the present disclosure is preferably employed for relatively large passenger vehicles such as SUVs and minivans. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle body front structure comprising:
    a front bumper beam that is positioned at a front end of a vehicle body and extends in a vehicle width direction;
    left and right bumper beam extensions that extend rearward from left and right longitudinal end portions of the front bumper beam, respectively;
    left and right extension side mount members that are provided at rear ends of the left and right bumper beam extensions, respectively;
    left and right front side frames whose front ends are coupled with the left and right extension side mount members, respectively; and
    left and right gussets that are positioned on left and right corners between outer surfaces in the vehicle width direction of rear end portions of the left and right bumper beam extensions and the left and right extension side mount members, respectively, wherein
    the left and right gussets are joined to the left and right bumper beam extensions, respectively and
    strength of the left and right gussets is higher than strength of the left and right bumper beam extensions, respectively.

2. The vehicle body front structure according to claim 1, further comprising:
    left and right front upper members that are positioned on outsides of the left and right front side frames in the vehicle width direction, respectively, and extend forward and downward from left and right front pillars, respectively,
    wherein the left and right gussets are joined to front lower end portions of the left and right front upper members via the left and right extension side mount members, respectively and
    front surfaces of the left and right gussets are inclined in a rearward direction of the vehicle body from the left and right bumper beam extensions to the outsides in the vehicle width direction, respectively.

3. The vehicle body front structure according to claim 1, wherein the left and right gussets are configured to have closed cross sections, respectively and
    left and right stiffening plates for reinforcement are provided in internal portions of the left and right gussets in vicinities of portions in the left and right gussets, respectively, the portions being joined to the outer surfaces in the vehicle width direction of the rear end portions of the left and right bumper beam extensions, respectively.

4. The vehicle body front structure according to claim 1, wherein the left and right extension side mount members are joined to inner surfaces in the vehicle width direction of the rear end portions of the left and right bumper beam extensions, respectively.

5. The vehicle body front structure according to claim 1, wherein the left and right extension side mount members clamp the rear end portions of the left and right bumper beam extensions and the left and right gussets, respectively, by upper portions and lower portions of the left and right extension side mount members, respectively.

6. The vehicle body front structure according to claim 2, further comprising:
    left and right side coupling members that couple the front lower end portions of the left and right front upper members with front end portions of the left and right front side frames, respectively,
    wherein the left and right side coupling members are joined to rear surfaces of the left and right extension side mount members, respectively.

7. The vehicle body front structure according to claim 1, wherein the left and right gussets are fastened to the left and right bumper beam extensions by using bolts, respectively.

8. The vehicle body front structure according to claim 1, wherein the left and right front side frames each have at least three yielding portions, which are left and right front side yielding portions, left and right intermediate yielding portions that are separately positioned in a rear of the left and right front side yielding portions, and left and right rear side yielding portions that are separately positioned in the rear of the left and right intermediate yielding portions,
    the left and right front side yielding portions are portions that absorb collision energy by being folded with protruding inward in the vehicle width direction when receiving a collision load which is applied from a front to the front end of the vehicle body,
    the left and right rear side yielding portions are energy absorbing portions that are capable of absorbing the collision energy by being folded outward in the vehicle width direction due to the collision load, and
    the left and right intermediate yielding portions are fold assisting portions that are capable of being folded outward in the vehicle width direction to allow the left and right front side yielding portions and the left and right rear side yielding portions to be folded.

9. The vehicle body front structure according to claim 1, wherein the left and right extension side mount members extend in the vehicle width direction, respectively.

10. The vehicle body front structure according to claim 1, wherein the left and right gussets are joined to the outer surfaces of the left and right bumper beam extensions, respectively, and
    the left and right gussets protrude outward in the vehicle width direction from the left and right bumper beam extensions, respectively.

11. The vehicle body front structure according to claim 4, wherein the left and right extension side mount members include flanges extending frontward and joined to the inner surfaces in the vehicle width direction of the left and right bumper beam extensions, respectively.

* * * * *